T. J. Jolly,
Making Fence Pickets.
Nº 60,900. Patented Jan. 1, 1867.
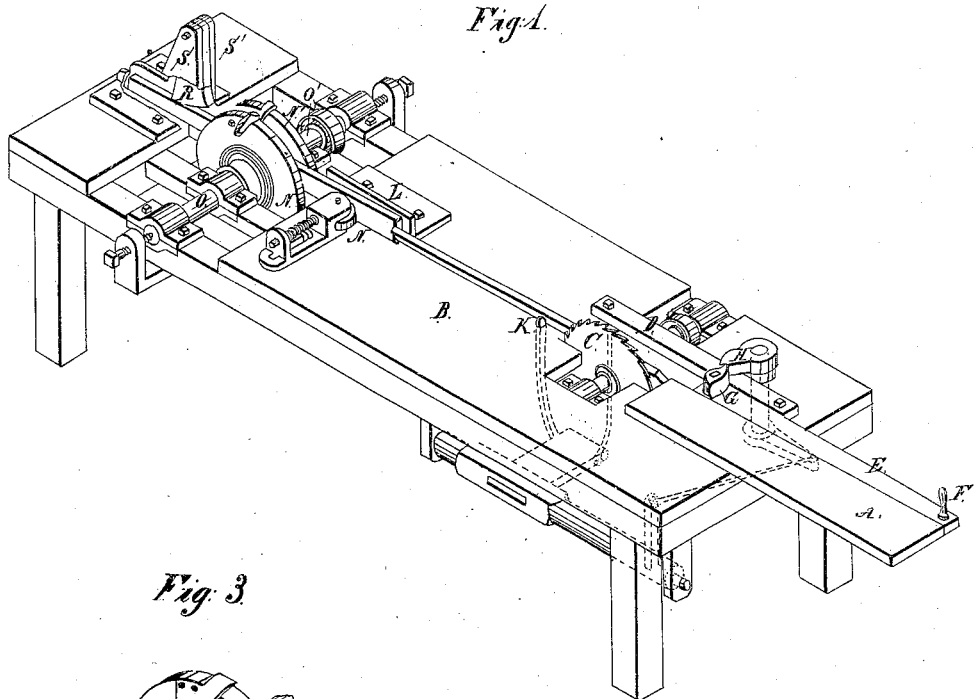
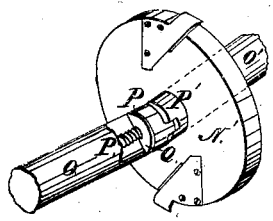
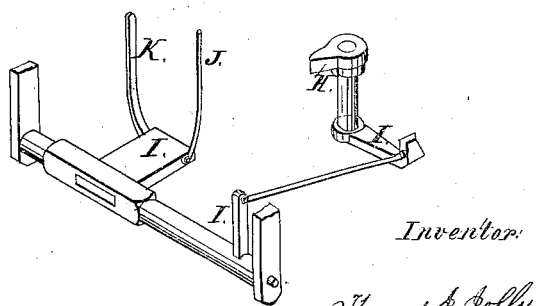
Witnesses:
Saml Knight
H. G. Webber
Inventor:
Thomas J. Jolly
By Knight Bros
Attys.

United States Patent Office.

THOMAS J. JOLLY, OF VERSAILLES, INDIANA.

*Letters Patent No. 60,900, dated January 1, 1867.*

---

IMPROVEMENT IN MACHINES FOR MAKING WOODEN PICKETS.

---

*The Schedule referred to in these Letters Patent and making part of the same.*

---

TO WHOM IT MAY CONCERN:

Be it known that I, THOMAS J. JOLLY, of Versailles, Ripley county, Indiana, have invented a new and useful Machine for Making Wooden Palings; and do hereby declare the following to be a full, clear, and exact description thereof, reference being had to the accompanying drawings, making part of this specification.

This invention relates to a machine for sawing up and planing of wooden palings at one operation.

Figure 1 is a perspective view of a machine embodying my invention.

Figure 2 shows the upsetting mechanism detached.

Figure 3 is an enlarged view of the planing heads.

The stuff to be operated upon consists of boards or slabs such as A, of the same length and thickness as the desired palings. This stuff is operated on upon a bench, B. C is a circular saw journalled horizontally on the bench, above whose top it projects for about a third of its diameter. This saw when in operation cuts in direction of the workman. Secured to the top of the bench parallel to the saw, and at any desired distance therefrom, is a guide or gauge, D. In order to secure the proper taper to the paling I introduce between the saw and the gauge D a sliding gauge strip or pattern, E, of the same taper as that desired for the paling. This pattern E has a handle, F, to enable its propulsion along the bench. Rising from the advancing end of the pattern E is a stud, G, which at the proper juncture strikes an arm, H, which extends horizontally above the bench from a system of compound levers, I, bearing two fingers, J and K, which, traversing suitable perforations in the bench, act at the proper moment after separation of a paling to uptip the same so as to place it on edge and consequently in a suitable position for the action of the planer. In performing this service the finger J acts as a stop or rest to hold one edge of the paling while the finger K elevates the other edge. This being effected, the fingers drop back by their own weight and the operator then reverses the slab A end for end, and applying the sliding gauge E to the newly sawn edge thrusts the stuff again forward to the action of the saw. This movement acts to advance the now upturned paling and causes it to enter and be acted upon by the planing mechanism which I will now proceed to describe. The end of the advancing paling enters between a guide, L, and pressure roller, M, which members serve to conduct it between a pair of planing or cutting heads, N N', revolving in direction of the arrow. The shafts O O' of the cutting heads are journalled horizontally in the bench but raking sufficiently forward to cause the convergence of the heads on the cutting side by as much as the depth of a cut. To enable one shaft to drive the other they are coupled together between the heads by a clutch connection, P P', each clutch, P P', has a screw-shank, p, which is tapped into the end of its shaft; one or more washers, Q, being introduced between the clutch and its shaft to serve to hold the planing heads N N', to smooth without wasting the particular stuff being operated upon. From the planing heads the paling passes under a segment roller, R, which permits the advance but prevents the retrogression of the finished paling. The roller R is for this purpose pivoted in a pair of cheeks, S S', which act to sustain the side of the paling in transition.

I claim herein as new and of my invention—

1. The arrangement of sliding gauge or pattern E, studs G, compound lever I, and fingers J and K, for upturning of the sawn paling as set forth.

2. In the described combination with the saw, upturning apparatus, and guides, I claim the double-headed raking planer N N', adapted to operate as set forth.

3. The arrangement of the segment roller R, cheeks S S', and planers, N N', substantially as and for the purposes specified.

In testimony of which invention I hereunto set my hand.

THOMAS J. JOLLY.

Witnesses:
GEO. H. KNIGHT,
JAMES H. LAYMAN.